United States Patent
Brisebois et al.

(10) Patent No.: US 10,499,334 B2
(45) Date of Patent: Dec. 3, 2019

(54) POWER EFFICIENT RADIO RECEIVER CONTROL

(71) Applicants: AT&T Intellectual Property I, L.P., Atlanta, GA (US); AT&T Mobility II LLC, Atlanta, GA (US)

(72) Inventors: Arthur Richard Brisebois, Cumming, GA (US); Haywood Peitzer, Randolph, NJ (US); Jianchun Zhou, Bellevue, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/852,818

(22) Filed: Dec. 22, 2017

(65) Prior Publication Data

US 2019/0200294 A1    Jun. 27, 2019

(51) Int. Cl.
*H04W 52/02* (2009.01)
*H04B 7/08* (2006.01)

(52) U.S. Cl.
CPC ...... *H04W 52/0229* (2013.01); *H04B 7/0802* (2013.01); *H04W 52/0274* (2013.01)

(58) Field of Classification Search
CPC .......... H04W 52/0229; H04W 52/0274; H04B 7/0802
See application file for complete search history.

(56) References Cited

U.S. PATENT DOCUMENTS

| | | | |
|---|---|---|---|
| 7,738,924 B2 | 6/2010 | Nakao | |
| 7,787,850 B2 | 8/2010 | Rofougaran | |
| 8,095,080 B2 | 1/2012 | Rofougaran | |
| 8,711,728 B2 | 4/2014 | Rofougaran | |
| 8,873,662 B2 | 10/2014 | Sesia et al. | |
| 8,892,176 B2 | 11/2014 | Kim et al. | |
| 9,131,440 B2 | 9/2015 | Rofougaran | |
| 9,271,322 B2 | 2/2016 | Vaidya et al. | |
| 2004/0106441 A1* | 6/2004 | Kazakevich | H04B 7/0837 455/574 |

(Continued)

OTHER PUBLICATIONS

Jensen et al., "LTE UE Power Consumption Model: For System Level Energy and Performance Optimization," Proceedings of the 2012 IEEE Vehicular Technology Conference, Sep. 3-6, 2012, IEEE 2012.

(Continued)

*Primary Examiner* — Thai Nguyen

(74) *Attorney, Agent, or Firm* — Hartman & Citrin LLC

(57) ABSTRACT

Concepts and technologies provided herein can provide power efficient radio receiver control for user equipment that can connect to a wireless network. A user equipment executing instructions via a processor can confirm that a battery charge state of the user equipment indicates charged or charging, and can check a user interface state of the user equipment. The user equipment can have at least one radio receiver that is initially active to support communicative coupling with the access point via a primary component carrier radio link. Based on the user interface state and/or the battery charge state that indicates charged or charging, the user equipment can activate additional radio receivers that are available to support the primary component carrier radio link until an active receiver capacity for supporting the primary component carrier radio link is met.

16 Claims, 5 Drawing Sheets

(56) References Cited

U.S. PATENT DOCUMENTS

2015/0271755 A1\* 9/2015 Karri ................ H04W 52/0229
  370/252
2016/0088570 A1 3/2016 Cui et al.

OTHER PUBLICATIONS

Ta et al., "Improving Smartphone Battery Life Utilizing Device-to-device Cooperative Relays Underlaying LTE Networks," 2014 IEEE International Conference on Communications, Jan. 22, 2014, IEEE 2014.

\* cited by examiner

POWER EFFICIENT RADIO RECEIVER CONTROL

BACKGROUND

Conventional evolved packet core networks can adhere to Long Term Evolution (LTE) standards and can support 2×2 MIMO. As conventional evolved packet core networks are modernized, access points (e.g., base stations, cell towers, eNodeBs, etc.) can be upgraded to provide additional transmitters to support higher than 2×2 MIMO (e.g., 4×4 MIMO, 8×8 MIMO, 16×16 MIMO, and beyond 16×16 MIMO). However, the process of upgrading all access points to support greater than 2×2 MIMO can take many years to implement and be very expensive for wireless network service providers. Moreover, conventional user equipment may only allow use of multiple radio receivers when certain network conditions are met (e.g., in-progress data packets are above a threshold amount and/or when a signal-to-noise ratio is high), thereby leaving user equipment located at the edge of the cell service at a disadvantage because of a low signal-to-noise ratio and/or a low amount of in-progress data packets. This can mean that a user equipment can have radio communication components (e.g., antennas, transmitters, and receivers) that are not fully utilized when connected to conventional evolved packet core networks.

SUMMARY

Concepts and technologies disclosed herein are directed to providing power efficient radio receiver control for a user equipment that can connect to a network. According to one aspect of the concepts and technologies disclosed herein, a user equipment that supports power efficient radio receiver control is disclosed according to an embodiment. The user equipment can include a plurality of radio receivers that are configured to communicatively couple to an access point. The user equipment can also include a processor and a memory that stores computer-executable instructions that, in response to execution by the processor, cause the processor to perform operations. The operations also can include confirming that a battery charge state of the user equipment indicates charged or charging. In some embodiments, at least one of the plurality of radio receivers is initially active to support communicative coupling with the access point via a primary component carrier radio link. The operations can further include activating, additional radio receivers that are available from the plurality of radio receivers to support the primary component carrier radio link until an active receiver capacity for supporting the primary component carrier radio link is met. In some embodiments, activating the additional radio receivers can be based on the battery charge state of the user equipment. In some embodiments, the additional radio receivers that are activated to support the primary component carrier radio link can implement spatial multiplexing.

In some embodiments, the operations can include verifying that less than all of the plurality of radio receivers capable of supporting the primary component carrier radio link have been activated by the user equipment. In some embodiments, the operations can further include creating an autonomous receiver activation message that indicates which of the plurality of radio receivers are active on the user equipment. In some embodiments, the operations also can include providing the autonomous receiver activation message to the access point to inform the access point of which of the plurality of radio receivers are active on the user equipment.

In some embodiments, the operations can include determining whether the user equipment is receiving transmissions from the access point via one or more secondary component carrier radio links. In some embodiments, the operations can include confirming that additional radio receivers of the plurality of radio receivers remain available to support receiving transmissions from the access point via the one or more secondary component carrier radio links. In some embodiments, in response to determining that the user equipment is receiving transmissions from the access point via one secondary component carrier radio link, the operations can include activating the additional radio receivers to support receiving transmissions from the access point via the one secondary component carrier radio link. In some embodiments, the additional radio receivers that are activated to support the secondary component carrier radio link can implement carrier aggregation.

In some embodiments, the operations can include identifying a secondary component carrier radio link of the plurality of secondary component carrier radio links that corresponds with a greatest carrier bandwidth. In some embodiments, identifying the second component carrier radio link with the greatest carrier bandwidth can be performed in response to determining that the user equipment is receiving transmissions with the access point via a plurality of secondary component carrier radio links. In some embodiments, the operations can include activating the additional radio receivers to support the secondary component carrier radio link that corresponds with the greatest carrier bandwidth. In some embodiments, the active receiver capacity for supporting the primary component carrier radio link is met prior to activation of at least one additional radio receiver to support receiving transmissions from the access point via one or more secondary component carrier radio links According to another aspect of the concepts and technologies disclosed herein, a user equipment that supports power efficient radio receiver control is disclosed according to another embodiment. The user equipment can include a plurality of radio receivers that are configured to communicatively couple to an access point. The user equipment can also include a processor and a memory that stores computer-executable instructions that, in response to execution by the processor, cause the processor to perform operations. The operations can include confirming that a battery charge state of the user equipment indicates discharging. The user equipment can include a plurality of radio receivers and at least one of a plurality of radio receivers of the user equipment can initially be active to support communicative coupling with the access point via a primary component carrier radio link. The operations also can include determining that a user interface state of the user equipment indicates that a data application is active on a display of the user equipment. The operations can further include activating additional radio receivers of the plurality of radio receivers to support the primary component carrier radio link. In some embodiments, additional radio receivers can continue to be activated until an active receiver capacity for the primary component carrier radio link is met. In some embodiments, activating the additional radio receivers that support the primary component carrier radio link can be based on one or more of the battery charge state indicating discharging, and the user interface state indicating that the data application is active on the display of the user equipment.

In some embodiments, the operations can also include determining that the user equipment is located at a service edge of a primary cell associated with the primary component carrier radio link. The access point can provide the primary cell. In some embodiments, the operations include maintaining activation of the additional radio receivers that support the primary component carrier radio link while the user equipment continues to be located at the service edge of the primary cell. In some embodiments, activation of the additional radio receivers is maintained at least until the display of the user equipment is off.

In some embodiments, the operations can include determining that the data application that is active is associated with an internet protocol call, where the internet protocol call is in progress via the primary component carrier radio link. The operations also can include maintaining activation of the additional radio receivers that support the primary component carrier radio link for a duration of the internet protocol call that is in progress via the primary component carrier radio link.

According to yet another aspect, a computer storage medium is disclosed. In some embodiments, the computer storage medium can reside on a user equipment. The computer storage medium can have computer-executable instructions stored thereon. When the computer-executable instructions are executed by a processor of the user equipment, the processor can perform operations. The operations can include confirming that a battery charge state of the user equipment indicates charged or charging. The user equipment can include a plurality of radio receivers, and at least one of the plurality of radio receivers can initially be active to support communicative coupling with an access point via a primary component carrier radio link. The operations also can include activating, based on the battery charge state of the user equipment, additional radio receivers that are available from the plurality of radio receivers to support the primary component carrier radio link until an active receiver capacity for supporting the primary component carrier radio link is met. In some embodiments, the operations can further include verifying that less than all of the plurality of radio receivers capable of supporting the primary component carrier radio link have been activated by the user equipment.

In some embodiments, the operations can create an autonomous receiver activation message that indicates which of the plurality of radio receivers are active on the user equipment. The operations can also include providing the autonomous receiver activation message to an access point to inform the access point of which of the plurality of radio receivers that are active on the user equipment. In some embodiments, the operations can include determining whether the user equipment is receiving transmissions from the access point via one or more secondary component carrier radio links. The operations can include confirming that additional radio receivers of the plurality of radio receivers remain available to support receiving transmissions from the access point via the one or more secondary component carrier links. In some embodiments, in response to determining that the user equipment is receiving transmissions from the access point via one secondary component carrier radio link, the operations can include activating the additional radio receivers to support receiving transmissions from the access point via the one secondary component carrier radio link.

In some embodiments, the operations can determine that the user equipment is receiving transmissions with the access point via a plurality of secondary component carrier radio links, and in response, the user equipment can identify a secondary component carrier radio link of the plurality of secondary component carrier radio links that corresponds with a greatest carrier bandwidth. The operations can include activating the additional radio receivers to support the secondary component carrier radio link that corresponds with the greatest carrier bandwidth. In some embodiments, the active receiver capacity for supporting the primary component carrier radio link is met prior to activation of at least one additional radio receiver to support receiving transmissions from the access point via one or more secondary component carrier radio links.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
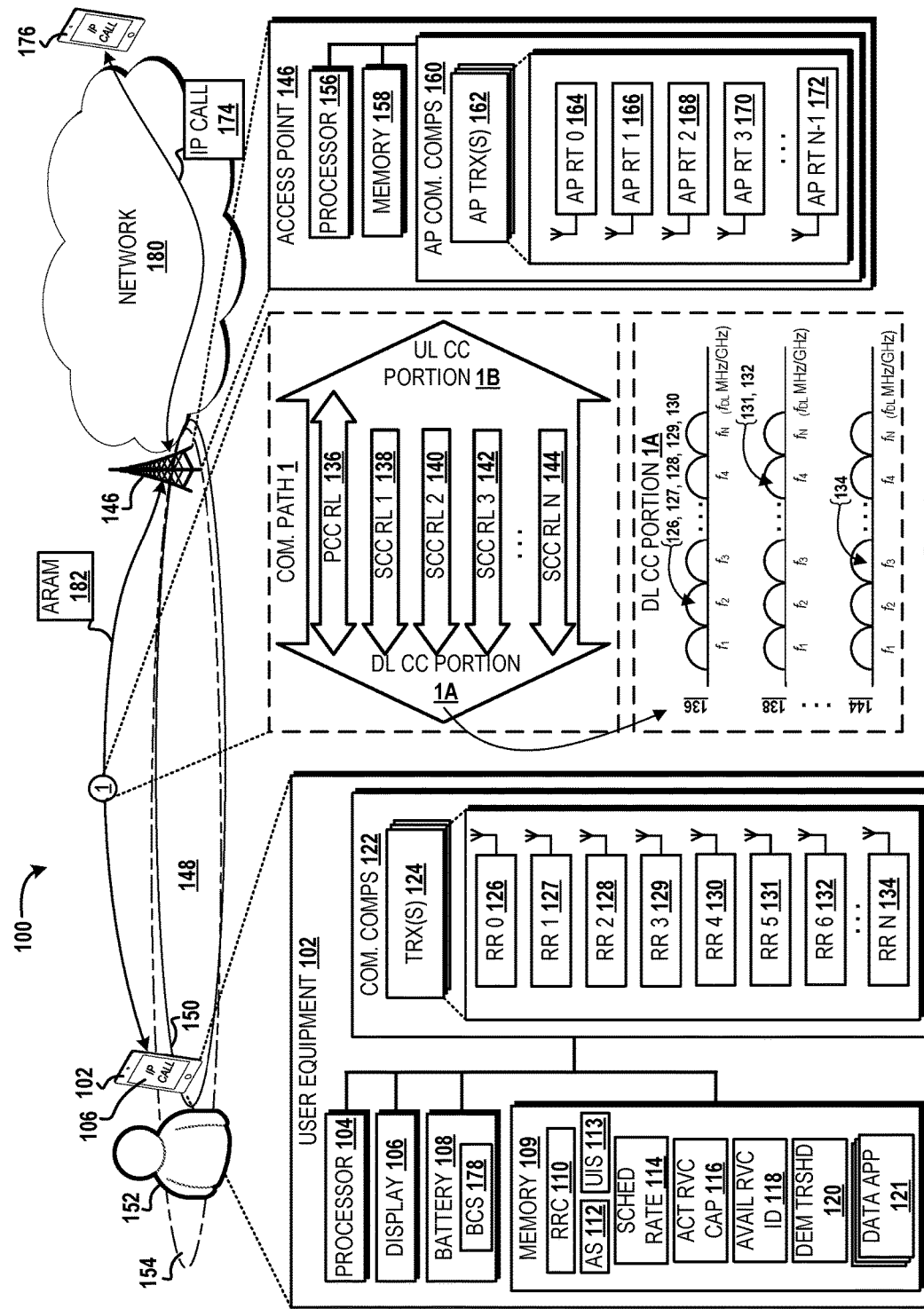
FIG. 1 is a block diagram illustrating aspects of an operating environment that includes a user equipment that can provide power efficient radio receiver control for communicative coupling to a network, according to an embodiment of the present disclosure.

User equipment (UE), such as mobile communication devices, continues to become more prevalent and allow for smaller, more compact form factors. Although electronics and circuitry have decreased in physical size, in operation the electronics may consume even greater amounts of energy. While conventional batteries can allow UE to function, conventional battery technology has not advanced at the same rate as that of the miniaturization of electronics. As such, consumers can become frustrated when their conventional UE, albeit computationally powerful, consumes energy wastefully while connected to a wireless network. For example, some network service providers operate a wireless network that provides various access points which allows the UE to connect to the wireless network, such as but not limited to, an evolved packet core network. Some access points (e.g., base stations, eNodeB's, etc.) can support communicative coupling via spatial multiplexing and carrier aggregation (which will be discussed below). For example, some access points may support MIMO (e.g., 2×2, 4×4, 8×8, etc.) through the use of multiple sets of radio transmitters and radio receivers to create multiple radio links for data transmission to radio receivers of a UE. It is understood that, as discussed herein, the radio receivers of the UE can be configured to support the same communication technology and/or standards (e.g., spatial multiplexing, carrier aggregation, LTE, LTE-Advanced, LTE-U, etc.) as the radio transmitters of the access point.

Conventional radio receiver control mechanisms on the UE may attempt to enable multiple radio receivers only when a scheduling rate (i.e., a rate of in-progress data packet flows within a communication path) indicates a pattern of high demand (e.g., the scheduling rate being above a demand threshold) and potential gain from an improved radio link. In the case of conventional 4×4 MIMO set up, for example, UE detects radio conditions (e.g., signal to noise ratio, channel quality indicators, etc.) and sends UE feedback to the access point, which in turn uses the UE feedback to determine if the radio quality and resource allocation patterns are suitable for multiple data streams to be configured between the access point and multiple radio receivers of the UE. If radio conditions are determined by the access point to be favorable, then the access point will typically send a radio resource control signal to the UE to engage in MIMO and the UE may activate one or more radio receivers on the UE to use to engage in network communication. However, these conventional radio receiver control techniques have a number of limitations.

First, the conventional techniques rely on the scheduling rate of in-progress data packets to be above a threshold before additional radio receivers (e.g., to support a network traffic) are used. However, often times the UE only uses currently active radio receivers to detect and estimate radio conditions instead of all available radio receivers, thereby causing the UE feedback (for potential activation of additional radio receivers on the UE) to provide a limited, non-holistic view of the actual radio conditions. In turn, this can yield a relatively pessimistic analysis of radio conditions that tends to not allow for additional radio receivers on the UE to be activated for network communication. Additionally, the conventional radio receiver control mechanisms are reactive in nature because the conventional techniques may require that data transactions between the UE and the access point must begin before the UE will detect a scheduling rate that indicates high demand (i.e., that the scheduling rate is above the demand threshold) and adapt to change a radio receiver configuration. However, some data applications executing on the UE can exhibit short-lived data transactions that occur in bursts (i.e., "bursty" transmission) and these transmissions may be completed before the conventional radio receiver control mechanisms even take effect to detect whether additional radio receivers are needed and/or could be used.

Additionally, conventional access points may have a limited number of radio transmitters (e.g., a cell site radio head on an eNodeB), such that the UE has a greater number of radio receivers than the access point has radio transmitters. For example, some access points in a network may have two radio transmitters, while a connected UE may have four or more radio receivers (e.g., 4, 8, 20, 100, or more radio receivers to support, for example, 4×4 MIMO, 8×8 MIMO, 20×20 MIMO, 100×100 MIMO, etc.). Because, in some instances, the number of radio receivers on a UE may exceed the number of radio transmitters on the access point that serves the UE, the conventional radio receiver control mechanisms may not use available radio receivers (i.e., radio receivers on the UE that are capable of being used to receive transmissions from the access point but are currently not active and currently not in use for communication with the access point) and/or efficiently configure the use of radio receivers on the UE.

As such, the present disclosure discusses embodiments that can provide power efficient radio receiver control to optimize the use of available radio receivers and resources on the UE when, for example, the amount of radio receivers on the UE exceeds the amount of radio transmitters on the access point (and/or the combined amount of radio transmitters from two or more access points that can serve the UE). Embodiments of the present disclosure provide radio receiver control operations that can optimize radio link performance and battery life of the UE to activate and enable additional radio receivers that would otherwise go unused, such as based on a battery charge state of the UE, based on an activity state (e.g., whether the UE is active or idle), based on a user interface state (e.g., whether a user interface is being presented on a display or whether the display is off), based on whether additional radio receivers are available to support a maximum capacity for a primary component carrier radio link, and/or whether the UE is using one or more secondary component carrier radio links to receive network communications, and if so, whether any additional radio receivers should be used to support the secondary component carrier radio link(s).

For example, embodiments of the present disclosure provide a radio resource controller that can consider the potential use of received data and whether use of additional receivers and battery power will deliver a noticeable experience benefit to the subscriber at all, such as at the beginning of data transactions when call startup can be vulnerable to marginal radio conditions. Additionally, the radio resource controller can prioritize the activation (i.e., use) of a primary component carrier radio link over that of a secondary component carrier radio link when radio receiver resources and/or battery resources are limited. The radio resource controller also can consider the battery charge state of the UE (e.g., whether the battery of the UE is charged, charging, or discharging) and vary the amount of additional radio receivers that should be used when the battery charge state is above or below a battery charge threshold (e.g., 80% of the total battery capacity of the UE), and in some instances activation of additional radio resources can depend on the activity state and/or the user interface state of the UE. For example, even when a battery charge state of the UE indicates that the UE is discharging, the radio resource controller can provide operations to activate additional radio receivers based on the activity state of the UE, such as if the radio resource controller determines that an application is executing in the foreground or background of the UE, whether a user is actively providing input to the UE or engaging in applications, whether the UE is idle, whether the application being used is latency sensitive (e.g., streaming video application), whether the UE is engaged in a call (e.g., an internet protocol based call), whether the UE is located at a service edge of the access point, or other factors that can consume radio and/or battery resources of the UE. The radio resource controller also can provide operations based on a user interface state, such as whether a display of the UE is on and presenting a user interface, whether the display is turned off, whether a speaker is being used to play audio or engage in a phone call (e.g., an internet protocol-based call), and/or other factors that can indicate whether or not a user interface is being engaged by a user. In some embodiments, although a battery of the UE may be discharging, the activation of additional radio receivers, such as to support the primary component carrier radio link in bi-directional network communications and/or to support the secondary component carrier radio link in downlink (receiving only) network communications, can increase the rate with which data transactions occur over the communication path, thereby reducing network congestion and increasing data transfer to the UE. In some embodiments, the radio resource controller can deactivate one or more radio receivers based on the activity state and/or the user interface state not meeting certain conditions, thereby reducing the battery drain, at least until one or more of the conditions discussed above are met so that the radio resource controller can reactivate additional radio receivers. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor based or programmable consumer electronics, distributed computing systems, minicomputers, mainframe computers, switches, network servers, network edge devices, and other particularized, non-generic computing machines.

Referring now to FIG. 1, aspects of an operating environment 100 for providing power efficient radio receiver control will be described, according to an illustrative embodiment. The operating environment 100 shown in FIG. 1 includes a user equipment (UE) 102, a user 152, a second UE 176, a communication path 1, an access point (AP) 146, and a network 180. The user 152 can include a subscriber to a wireless communication service for the UE 102 to communicatively couple with the network 180. The user 152 can be associated with the UE 102 and use the UE 102 to engage in an internet protocol (IP) call, such as the IP call 174, with another UE, such as the second UE 176, via the network 180. Examples of the UE 102 can include, but should not be limited to, a mobile communication device, a computer system, an IP-enabled telephone device, a laptop, a tablet device, a wearable device, a desktop telephone, any other type of computing device capable of initiating and/or receiving voice and data communications, or combinations thereof. Similarly, the second UE 176 can include, but should not be limited to, a mobile communication device, a computer system, an IP-enabled telephone device, a laptop, a tablet device, a wearable device, a desktop telephone, any other type of computing device capable of initiating and/or receiving voice and data communications, or combinations thereof. It is understood that the use of the term "second" as an adjective (e.g., the second UE 176) should not be construed to imply an order, a ranking, a hierarchy, or any preference, but rather is use for clarification purposes only.

The AP 146 can include, but should not be limited to, a base station, a cell tower, a remote radio head, a Node B, an eNodeB, a relay node, a combination thereof, or any other network device that can communicatively couple to the UE 102 to facilitate access to the network 180. In some embodiments, the AP 146 can support spatial multiplexing and/or carrier aggregation. In some embodiments, the AP 146 can conform to various communication technology standards, such as LTE, LTE-Advanced, 4G, 5G, or the like. The AP 146 can include a processor 156, a memory 158, and a plurality of communication components, such as AP communication components 160. The processor 156 can provide processing resources that include one or more hardware components that perform computations to process data, and/or to execute computer-executable instructions of one or more application programs, operating systems, and/or other software that enable the AP communication components 160 to provide communicative coupling with the UE 102.

The processor 156 can include one or more central processing units ("CPUs") configured with one or more processing cores. Those skilled in the art will appreciate the implementation of the processor 156 can utilize various computation architectures or combinations thereof, and as such, the processor 156 should not be construed as being limited to any particular computation architecture or combination of computation architectures, including but not limited to an ARM architecture, available for license from ARM HOLDINGS of Cambridge, United Kingdom, and/or an x86 architecture, such an architecture available from INTEL CORPORATION of Mountain View, Calif., and others. The memory 158 can include one or more hardware components that perform storage operations, including temporary or permanent storage operations. In some embodiments, the memory 158 can include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), erasable programmable ROM ("EPROM"), electrically erasable programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the processor 156. It is understood that, as used in the claims, the term "memory" does not include signals per se.

In some embodiments, the AP communication components 160 of the AP 146 can include communication resources, such as but not limited to, hardware and circuitry that can provide wireless radio links for communicative coupling with the UE 102. For example, the AP communications components 160 can include, but should not be limited to, one or more remote radio head, communication buses, switches, routers, one or more input and/or output processors (e.g., a network interface controller and/or wireless radio), one or more modems, one or more codec chipset, one or more pipeline processors, one or more fast Fourier transform ("FFT") processors, one or more digital signal processors ("DSPs"), one or more speech synthesizers, and/or the like.

The AP communication components 160 also can include one or more transceivers, such as AP transceivers 162. The AP transceivers 162 can include a plurality of radio transmitters (RT), such as the AP RT 0 164, the AP RT 1 166, the AP RT 2 168, and the AP RT 3 170. It is understood that, in some embodiments, the AP 146 may include only one, two, or three radio transmitters, such as one or more of the AP RT 0 164, the AP RT 1 166, the AP RT 2 168, the AP RT 3 170, the AP RT N−1 172, or any combination thereof. In some embodiments, the AP transceivers 162 can include more than four transmitters. In some embodiments, the AP transceivers 162 can include a total number of AP RTs that is at least one less than a total amount of radio receivers of the UE 102, where the total number of AP RTs are represented in the FIG. 1 as the AP RT N−1 172. As used herein, the term "N−1" is intended to refer to at least one less than the "N" number of radio receivers that reside on the UE 102. For example, in some embodiments, if the AP 146 has three or fewer radio transmitters, then the UE 102 may have four or more radio receivers. As another example, if the AP 146 has six radio transmitters, then the UE may have more than six radio receivers. In yet another example, if the AP 146 has only two radio transmitters, the UE 102 may have more than two radio receivers. It is understood that the number of AP RTs illustrated is for example purposes only. The example illustrated in FIG. 1 is intended to pertain to an embodiment in which the number of radio transmitters of the AP 146 is less than the number of radio receivers that reside on the UE 102. It is understood that the examples provided are for illustration purposes only, and therefore should not be construed as limiting the scope of the disclosure.

The AP 146 can communicatively couple with the UE 102 via a communication path, such as the communication path 1, that is provided by one or more of the AP transceivers 162 and one or more of the radio transceivers of the UE 102. The communication path 1 can include one or more radio links that facilitate communicative coupling. A radio link (e.g., any of the radio links 136, 138, 140, 142, 144) can have one or more carriers, where the term "carrier" refers to a communication channel located within a frequency band. A "frequency band" is a selected frequency range in the electromagnetic spectrum. In some embodiments, the frequency band can be measured in megahertz (MHz). In some embodiments, when one or more carriers are used for wireless communications that implement carrier aggregation (e.g., through the use of time division duplex and/or frequency division duplex), each carrier can be referred to as a component carrier. Carrier aggregation refers to the aggregation of one or more carriers that can transmit data streams in parallel to and/or from the UE 102 to obtain an increase in throughput data transfer. In some embodiments, the communication path 1 can facilitate carrier aggregation that is contiguous and/or non-contiguous. In a contiguous type of carrier aggregation, the component carriers are located adjacent to one another and are typically located within a single frequency band (i.e., intra-band). Each adjacent component carrier may have the same bandwidth, or different bandwidths. A bandwidth is a selection portion of the frequency band, and can be measured in MHz. In a non-contiguous type of carrier aggregation, the component carriers may be separate along a single frequency band and/or located in different frequency bands (i.e., inter-band).

When the UE 102 seeks to (re)connect with the network 180, the UE 102 can adhere to various wireless mobile communication standards and protocols, such as a third generation partnership project (3GPP) long term evolution (LTE) standard and the like (e.g., subsequent releases such as LTE-Advanced, 5G, etc.). The UE 102 can be configured to scan, select, and request attachment to the AP 146 using an available component carrier, which can be confirmed. The AP 146 can receive a radio resource control signal that configures and grants the UE 102 access to the AP 146 via the communication path 1 on a selected carrier. The carrier that is selected by the UE 102 for attachment to the AP 146 can be considered the initial and default carrier, referred to herein as a primary component carrier radio link (PCC RL).

All other carriers that are not a part of the PCC RL, but are used by the UE 102 to communicate with the AP 146, can be referred to as a secondary component carrier radio link (SCC RL). For example, the communication path 1 can include the PCC RL 136 and one or more SCC RLs, such as the SCC RL 1 138, the SCC RL 2 140, the SCC RL 3 142, and the SCC RL N 144. The term "N" used in the phrase "SCC RL N" refers to a total number of SCC RLs that can be supported along the communication path 1 subject to the UE 102 having enough available radio receivers and the AP 146 having enough radio transmitters to support more than three SCC RLs.

The PCC RL 136 can be the effective signaling anchor for any calls and/or transmissions to the AP 146, and can include any radio resource control signaling and at least some data traffic. The SCC RLs 138, 140, 142, and 144 can be used to carry additional data traffic to allow for higher throughput. In some embodiments, the UE 102 can dynamically change the component carriers that make up the SCC RLs. In some embodiments, the PCC RL 136 can be numbered "zero", for all instances of the communication path 1, and the different SCC RLs 138, 140, 142, and 144 can be assigned a unique number (e.g., "1"-"N") through specific radio resource control signaling between the UE 102 and the AP 146. In some embodiments, the communication path 1 does not include one or more SCC RLs (e.g., any of the SCC RLs 138, 140, 142, and/or 144), but rather only the PCC RL 136. In some embodiments, the communication path 1 may initially include just the PCC RL 136, but later one or more of the SCC RLs 138, 140, 142, and/or 144 can be added to the communication path 1.

In some embodiments, the communication path 1 can have a downlink component carrier portion 1A that provides transmissions from the AP 146 to the UE 102, and an uplink component carrier portion 1I1 that provides transmissions from the UE 102 to the AP 146. As used herein, the uplink component carrier portion 1B corresponds with uplink transmission for the PCC RL 136. For clarity, the communication path 1 in FIG. 1 is illustrated as a having multi-directional arrows for the PCC RL 136 and the SCC RLs 138, 140, 142, 144, however it is understood that a portion of each radio link can be for uplink traffic and/or downlink traffic. For illustration purposes only, the PCC RL 136 and the SCC RLs 138, 140, 142, and 144 (shown in FIG. 1) will be discussed with respect to the downlink component carrier portion 1A of the radio links. In some embodiments, the downlink component carrier portion 1A and the uplink component carrier portion 1I1 of each radio link can use different bandwidths and/or frequency bands. In some embodiments, one of the SCC RLs (e.g., any of SCC RLs 138, 140, 142, and/or 144) may be present in the downlink component carrier portion 1A, but not present in the uplink component carrier portion 1B. It is understood that the examples provided are for illustration purposes only, and therefore should not be construed as limiting the scope of the disclosure in any way. It is also understood that while the examples discussed herein may refer to LTE and carrier aggregation terminology, embodiments of the present disclosure can be applied to other communication technologies, standards, and/or protocols, and therefore should not be construed as limiting the scope of disclosure in any way.

In some embodiments, the AP 146 can be configured to provide the communication path 1 to the UE 102 while the UE 102 is located within a service edge 150 of the AP 146. In some embodiments, the AP 146 can be configured to provide a primary cell 148, and/or a secondary cell 154. The primary cell 148 can be formed by a unique set of radio transmitters from amongst one or more of the AP transceivers 162 (e.g., any of the AP RT 0 164, the AP RT 1 166, the AP RT 2 168, the AP RT 3 170, and the AP RT N−1 172). The primary cell 148 is illustrated in FIG. 1 as providing wireless service coverage by the AP 146 up to the service edge 150. The service edge 150 is associated with a wireless communication service boundary in which wireless communicative coupling between the UE 102 and the AP 146 may become faulty (e.g., due to higher instances of data packet loss and/or loss of signal transmission strength from the AP 146) for one or more radio links 136, 138, 140, 142, and 144 of the communication path 1. In some embodiments, the secondary cell 154 can be formed by a separate, unique set of radio transmitters from amongst one or more of the AP transceivers 162 (e.g., any of the AP RT 0 164, the AP RT 1 166, the AP RT 2 168, the AP RT 3 170, and the AP RT N−1 172), where the secondary cell 154 is associated with radio transmitters that are distinct from the radio transmitters of the AP 146 that correspond with the primary cell 148. In some embodiments, the PCC RL 136 of the communication path 1 can be provided by the primary cell 148 while the UE 102 is within the service edge 150 of the primary cell 148. It is understood that, in some embodiments, the UE 102 may be within range with another access point such that the UE 102 could be communicatively coupled to more than one access point. Thus, in some embodiments, the PCC RL 136 could be provided by the AP 146, while one or more SCC RLs may be provided or otherwise associated with another access point of the network 180. However, for clarity purposes only, the communication path 1 (along with the PCC RL 136 and the SCC RLs 138, 140, 142, and 144) will be discussed in terms of being associated with the AP 146. The example provided above are for illustration purposes only, and therefore should not be construed as limiting the scope of the present disclosure in any way.

The UE 102 can receive and/or transmit communications and data to the AP 146 via the communication path 1. The UE 102 can include a processor 104 and a memory 109. The memory 109 can store, and the processor 104 can execute, the operating system and one or more applications, programs, and/or computer executable instructions, such as, for example, a radio resource controller ("RRC") 110. The RRC 110 can be executable instructions, modules, programs, routines, algorithms, or other commands that can configure communication components of the UE 102. The RRC 110 can configure the UE 102, via execution of the processor 104, to provide various operations discussed herein. The UE 102 can include a power source, such as a battery 108. The battery 108 can have electrochemical cells that can be electrically coupled to a power supply external to the UE 102 such that the battery 108 can be recharged (e.g., via wired and/or wireless charging). In some embodiments, the memory 109 and the battery 108 can include circuitry that allows for communicative coupling to a communication bus. In some embodiments, the RRC 110 can obtain information about the battery 108 via the communication bus. For example, the RRC 110 can determine a battery charge state (BCS) 178 of the battery 108. As used herein, the phrase "battery charge state" refers to an operational mode of the battery 108, such as "charged," "charging," or "discharging."

In some embodiments, the RRC 110 can determine whether the BCS 178 is charged, charging, or discharging based on a defined charge threshold and whether the battery 108 is currently receiving power from an external power supply. For example, the RRC 110 can determine that the BCS 178 corresponds with "charging" when the battery 108 is currently receiving power from an external power supply (e.g., via wired and/or wireless electrical coupling to recharge the battery 108 from a source external to the UE 102). The RRC 110 can determine that the BCS 178 corresponds with "discharging" when the battery is not currently receiving power from an external power supply, but instead depending on the battery 108 to power the UE 102. The RRC 110 can determine that the BCS 178 corresponds with "charged" based on the defined charge threshold (irrespective of whether the UE 102 continues to receive and/or be electrically coupled to an external power supply). The defined charge threshold indicates a power level of the battery 108 that is considered to be sufficient for the RRC 110 to activate (i.e., enable and use) one or more radio receivers (e.g., the RRs 126-134 which will be discussed in further detail below) to facilitate added throughput via the communication path 1. In some embodiments, the RRC 110 can configure the defined charge threshold to correspond with an 80% level of battery charge, however this may not always be the case in all embodiments. For this example, when the battery 108 has a charge above 80% of power capacity (e.g., measured in milliamp hours (mAh)), the RRC 110 will consider the BCS 178 to correspond with a "charged" state. It is understood that the examples discussed herein are provided for illustration purposes only, and therefore should not be construed as limiting in any way.

The UE 102 also can include communication components, such as the plurality of communication components 122. The communication components 122 can include communication resources, such as but not limited to, hardware and circuitry that can facilitate wireless communicative coupling with the AP 146. For example, the communications components 122 can include, but should not be limited to, one or more input and/or output processors (e.g., a network interface controller and/or), one or more modems, one or more codec chipset, one or more fast Fourier transform ("FFT") processors, one or more digital signal processors ("DSPs"), one or more speech synthesizers, one or more transceivers 124, and/or the like. In some embodiments, the transceivers 124 can include one or more antennas, one or more radio transmitters, and one or more radio receivers (RR), such as the RR 0 126, the RR 1 127, the RR 2 128, the RR 3 129, the RR 4 130, the RR 5 131, the RR 6 132, and RR N 134. The phrase "RR N" refers to any number of radio receivers that can reside on the UE 102. In some embodiments, the number of RRs that can be used by the UE 102 exceed the number of radio transmitters of the AP 146 that are available for wireless communication. Although seven RRs of the UE 102 are shown in FIG. 1, it is understood that, in some embodiments, the UE 102 includes less than seven or more than seven radio receivers. For illustration purposes only, FIG. 1 represents an embodiment in which the number of RRs 126-134 of the UE 102 exceed the number of AP RTs 164-172 of the AP 146. It is understood that the examples provided are for illustration purposes only, and therefore should not be construed as limiting the present disclosure in any way.

In various embodiments, the RRC 110 can control whether each of the RRs 126-134 is activated for use in communicative coupling with the AP 146, thereby allowing the RRC 110 to have at least some control in enabling and/or disabling one or more of the RRs 126-134. For example, the user 152 can interact with a user interface shown on a display 106 of the UE 102. The interaction by the user 152 can provide input that triggers the launch of one or more data application, such as the data application 121. The data application 121 can be any application, program, and/or executable instructions that cause the UE 102 to communicate over the communication path 1 (e.g., such as by sending and/or receiving network packets to and/or from the AP 146) and generate data traffic via the use of the communication components 122. Examples of the data application 121 can include, but should not be limited to messaging applications, text-to-speech and speech-to-text applications, add-ons, plug-ins, email applications, web browsers, social media applications, navigation applications, ecommerce applications, music applications, video applications, camera applications, location-based service applications, game applications, virtual reality applications, augmented reality applications, productivity applications, entertainment applications, enterprise applications, financial applications, combinations thereof, and the like.

In an embodiment, the data application 121 is communicating with the network 180 via the AP 146 using the PCC RL 136 of the communication path 1. The RRC 110 may have initially requested for a radio resource control scheduling from the AP 146 (e.g., via radio resource control signaling), and the AP 146 may have granted the UE 102 permission to communicate over the PCC RL 136, such that the UE 102 activates and initially uses the RR 0 126 and the RR 1 127 to support the PCC RL 136. For example, FIG. 1 provides a representation of the communication path 1, where the PCC RL 136 is shown to have an uplink component carrier (UL CC) portion 1B and a downlink component carrier (DL CC) portion 1A. The UL CC portion 1B and the DL CC potion 1A of the PCC RL 136 support bi-directional communications, such that the UE 102 can send transmissions of network traffic to, and receive transmissions of network traffic from, the access point 146. Additionally, FIG. 1 shows multiple secondary component carrier radio links (e.g., SCC RLs 138-144), where the SCC RLs 138-144 are shown to only have a DL CC portion 1A of the communication path 1, and not have the UL CC portion 1B. The SCC RLs 138-144 are shown to have only the DL CC portion 1A because, in the illustrated embodiment, the UE 102 only uses the SCC RLs 138-144 for unidirectional communication, specifically for only receiving transmissions of network traffic from the access point 146 over one or more of the SCC RLs 138-144. As such, in some embodiments, the radio resource controller 110 may activate one or more additional radio receivers of the UE 102 to support one or more of the SCC RLs 138-144 only when the SCC RLs 138-144 are used to receive transmissions of network traffic from the access point 146 and not used to send transmissions of network traffic to the access point 146. This can be because the radio resource controller 110 can route uplink communications through only the PCC RL 136, while downlink communications can occur via the PCC RL 136 and the SCC RLs 138-144. In some embodiments, the RRC 110 can use radio receivers (e.g., the RRs 126-134) to support the PCC RL 136 and one or more of the SCC RLs 138-144 through the implementation of techniques such as time division duplexing and/or frequency division duplexing associated with carrier aggregation.

As illustrated in FIG. 1, the PCC RL 136 and the SCC RLs 138-144 are shown to correspond with a particular carrier bandwidth f, where f indicates a particular bandwidth frequency that can be used to communicate with the AP 146, and the bandwidth frequency can be measured in Hz, such as MHz and/or GHz. For example, FIG. 1 illustrates a DL CC portion 1A that corresponds with the PCC RL 136 and each of the SCC RLs 138-144. The PCC RL 136 is shown to correspond with a particular carrier bandwidth, $f_2$, where one or more of the radio resources can send and/or receive transmissions of network traffic using the carrier bandwidth $f_2$ assigned to the PCC RL 136. In some embodiments, the carrier bandwidth $f_2$ can correspond with, for example, a bandwidth from 1 MHz to 20 MHz, however other bandwidths can be used, and the example should not limit the scope of the present disclosure. For example, in some embodiments, $f_2$ can correspond with a millimeter wave bandwidth, such as a bandwidth that is from 24 GHz to 100 GHz. In some embodiments, the RRC 110 can determine that the PCC RL 136 (or any other SCC RLs 138-144) has a maximum number of radio receivers that could be active and used to support communications over the PCC RL 136 (and the SCC RLs 138-144), where the maximum number is referred to as an active receiver capacity 116. In some embodiments, the active receiver capacity 116 can be a stored value in the memory 109. For example, the RRC 110 can determine that the active receiver capacity 116 indicates that a maximum of five (ten, twenty, fifty, etc.) radio receivers can be enabled and active to use in facilitating sending and receiving transmissions of network traffic via the PCC RL 136 of the communication path 1. The number of available radio receivers that remain unused, but capable of being activated by the RRC 110 to support the PCC RL 136 and/or one or more of the SCC RLs 138-144, can be identified in an available receivers identifier 118. For example, in an embodiment, the UE 102 has more than two radio receivers (e.g., the seven RRs 126-134 shown in FIG. 1) that are capable of being used for communication. In the example above where a maximum of five radio receivers can support the PCC RL 136, the UE 102 may have initially activated two radio receivers, such as the RR 0 126 and the RR 1 127, to support bi-direction communications on the PCC RL 136. The RRC 110 can determine that three additional radio receivers could be used to send and receive network traffic over the PCC RL 136. Thus, from the remaining available radio receivers that could be activated on the UE 102 (e.g., the RRs 128-134), the RRC 110 can activate three additional radio receivers to support communicating over the PCC RL 136. Similarly, the RRC 110 can determine whether one or more SCC RL 138-144 are in use, and if so, the number of radio receivers being used to support the particular SCC RL. If additional radio receivers remain unused, yet available to be used to support a particular SCC RL, the RRC 110 can activate radio receivers until the active receiver capacity 116 is met for the particular SCC RL. If the PCC RL 136 and multiple SCC RLs are in use, then the RRC 110 can first activate additional radio receivers to support the PCC RL 136, and then can determine (and give priority to) the SCC RL that can support the greatest (aggregated) bandwidth, so that the RRC 110 can activate additional radio receivers (if available) to support that particular SCC RL. If additional radio receivers remain available, the RRC 110 can continue to activate radio receivers to support another SCC RL in receiving transmissions (i.e., only allowing downlink communications), with priority given to the next greatest (aggregated) bandwidth. In the example above, because only two RRs are initially being used (i.e., the RR 0 126 and the RR 1 127), the UE 102 has five available radio receivers that can be activated and used to support one or more of the radio links up to the active receiver capacity 116 for each radio link.

In some embodiments, the UE 102 may be using the data application 121 to engage in an internet protocol (IP)-based call, such as the IP call 174. Examples of the IP call 174 can include an IP-based voice call and/or video call. Initially, the data traffic associated with use of the data application 121

(or any other application or process executing on the UE 102) may be measured by the RRC 110 in terms of a scheduling rate 114. In some embodiments, the communication components 122 can engage in network-controlled resource allocation routines that configure which of the RRs 126-134 are active (i.e., in use for one or more radio links of the communication path 1) to communicate with the AP 146 when the scheduling rate 114 is above and/or below a demand threshold 120. The demand threshold 120 corresponds with a percentage of peak data rate (e.g., measured as a percentage of throughput capacity) provided by one or more radio links (e.g., any of the PCC RL 136 and the SCC RLs 138, 140, 142, and 144) that are being used in the communication path 1. In some embodiments, when the scheduling rate 114 is below the demand threshold 120, conventional UEs may not make a request for the AP 146 to increase throughput capacity for the UE 102 (e.g., by the AP 146 sending radio resource control signaling that request and are granted use of additional radio receivers on the UE 102). However, in an optional embodiment, the RRC 110 can determine whether the current scheduling rate 114 is below the demand threshold 120 for in-flow data packets traversing the communication path via use of the communication components 122, and if so, can activate additional radio receivers.

In various embodiments, the RRC 110 can facilitate power efficient radio receiver control. In some embodiments, network communications of the UE 102 can occur using the PCC RL 136, where the PCC RL 136 is being supported by less than all of the RRs that reside on the UE 102 (e.g., by RR 0 126 and/or RR 1 127). In some embodiments, the RRC 110 can also confirm that BCS 178 indicates "charged" or "charging," such as by confirming that the UE 102 is electrically coupled to an external power supply or that a current power level of the battery 108 is above the defined charge threshold (e.g., above 80% of charge capacity). In some embodiments, when the BCS 178 indicates charged or charging, the RRC 110 can activate additional radio receivers that are available for use, where the additional radio receivers are activated (i.e., enabled, powered up, and put into use) to support and otherwise facilitate communication over the PCC RL 136. For example, the PCC RL 136 may initially be provided through the use of the RR 0 126 and the RR 1 127. When the RRC 110 determines that the BCS 178 indicates charged or charging, the RRC 110 may instruct one or more of the RRs 128-134 to turn on and begin sending and/or receiving data packets for the PCC RL 136 at the designated carrier frequency used by the PCC RL 136 (e.g., $f_2$ indicated in the downlink component carrier portion 1A illustrated in FIG. 1). In some embodiments, the RRC 110 can activate one additional radio receiver at a time until the active receiver capacity 116 for supporting the PCC RL 136 is met or activate an amount of radio receivers in parallel to reach the active receiver capacity 116 for supporting the PCC RL 136. For instance, in the example above, the PCC RL 136 was initially provided via the use of the RR 0 126 and the RR 1 127. For this example, the RRC 110 can determine, through a value indicated in the active receiver capacity 116, that the PCC RL 136 can be supported using a maximum of five radio receivers. Because two radio receivers are already in use (here the RR 0 126 and the RR 1 127), the RRC 110 can determine that three additional radio receivers can be used to support the PCC RL 136. In some embodiments, the RRC 110 can determine, using the available receivers identifier 118, that the RR 2 128, the RR 3 129, and the RR 4 130 are available for use, and therefore can activate each of them sequentially and/or in parallel to support network traffic along the PCC RL 136. As shown in the downlink component carrier portion 1A of FIG. 1, the PCC RL 136 is supported by the RR 0 126, the RR 1 127, the RR 2 128, the RR 3 129, and the RR 4 130; however, it is understood that the specific radio receivers being used are for illustration purposes only. In some embodiments, the RRs 126-130 can support the PCC RL 136 through carrier aggregation, including time division duplexing and/or frequency division duplexing. In some embodiments, the RRs 126-130 can support the PCC RL 136 through implementation of spatial multiplexing, however this may not always be the case in all embodiments. The additional radio receivers can be activated and put into use by the RRC 110 autonomously.

In some embodiments, the RRC 110 can activate one or more available RRs based on an activity state 112 of the UE 102 and/or a user interface state 113 of the UE 102. In some embodiments, the activity state 112 can indicate, what applications are executing on the UE 102 (e.g., whether the data application 121 is executing), whether the UE 102 is engaged in an IP call (e.g., the IP call 174), whether an application is being used in the foreground or background of a user interface shown on the display 106, whether the UE 102 is located at a service edge of a primary cell and/or a secondary cell of the AP 146 (e.g., the service edge 150 associated with the primary cell 148 of the AP 146). In some embodiments, the user interface state 113 can indicate whether the display 106 is on or off, whether the data application 121 is actively being presented on the display 106 of the UE 102, whether a speaker of the UE 102 is being used, and/or other operations on the UE 102 that indicate whether a user is actively engaging a user interface of the UE 102. In some embodiments, the RRC 110 may activate additional radio receivers (e.g., any of the RRs 128-134 in the above example) based on the activity state 112 and/or the user interface state 113, such as when at least one of the activity state 112 and/or the user interface state 113 indicates certain conditions, such as but not limited to, when the display 106 is on, when an application (e.g., the data application 121) is being presented in the foreground on the display 106, when the UE 102 is engaged in the IP call 174, when the speaker is being used, when the UE 102 is located at and/or near the service edge (e.g., by determining that a data packet loss rate is above a loss rate threshold, such as 50% of packets being lost, and/or signal strength is low, such as less than 30% of signal being received), a combination thereof, or the like. It is understood that the conditions above can be combined in any configuration, and the example above is presented for illustration purposes only.

In some embodiments, the RRC 110 can determine whether the UE 102 is communicating with the AP 146 via one or more SCC RLs (e.g., one or more of the SCC RLs 138-144) on the communication path 1. If so, then the RRC 110 can confirm whether any radio receivers remain available for use to support communicating with the AP 146 over the one or more SCC RLs. For instance, in an embodiment, the RRC 110 can determine that the UE 102 is communicating with the AP 146 over the communication path 1 that can include the PCC RL 136 and the SCC RL 1 138. After adding additional radio receivers to support the PCC RL 136 (e.g., adding the RRs 128-130 to reach the active receiver capacity of five radio receivers for the PCC RL 136), the RRC 110 can determine that the RR 5 131 is active and being used to support the SCC RL 1 138. The RRC 110 can confirm that the RR 6 132 remains available because it is not in use to support a radio link of the communication path 1. Once confirmed, the RRC 110 can activate the RR 6 132 so that both the RR 5 131 and the RR 6 132 can support communication and network traffic with the AP 146 over the SCC RL 1 138, such as shown in the example illustrated in the downlink component carrier portion 1A of the FIG. 1. In some embodiments, the UE 102 may have radio receivers that still remain available after the active receiver capacity 116 has been met for the PCC RL 136 and at least one additional radio receiver has been added to support the SCC RL 1 138 (e.g., activation of the RR 6 132). In some embodiments, the RRC 110 may continue to activate additional radio receivers that are available to support the SCC RL 1 138. In some embodiments, the one or more additional radio receivers that are used to support the SCC RLs (e.g., any of the 138-144) can be used in only downlink transmissions (i.e., only the downlink component carrier portion 1A of the communication path 1) so as to provide asymmetrical carrier aggregation, such as through time division duplexing and/or frequency division duplexing. The RRC 110 can activate the RRs 128-130 in an asymmetrical radio receiver configuration such that the number of radio receivers allocated to the PCC RL 136 and/or one or more of the SCC RLs 138-144 can be unequal and dynamically vary and adapt to conditions discussed herein, such as the user interface state 113, the battery charge state 178, and/or the activity state 112. By activating additional radio receivers to support the PCC RL 136 and/or the SCC RLs 138-144, the RRC 110 can promote the minimization of transmission latency in order to allow a data transaction to be completed faster than the transaction would have been without the addition of the available radio receivers.

In some embodiments, the RRC 110 can determine that, in addition to the PCC RL 136, the communication path 1 also includes two or more SCC RLs in use (e.g., the SCC RL 1 138 and the SCC RL 2 140) to communicate with the AP 146. If two or more SCC RLs are being used for network communication with the AP 146, the RRC 110 can determine which SCC RL should be allocated additional radio receivers to support communication with the AP 146. For example, in some embodiments, after adding additional radio receivers to support the PCC RL 136 (e.g., adding the RRs 128-130 to reach the active receiver capacity of five radio receivers for the PCC RL 136), the RRC 110 can determine which of the two or more SCC RLs corresponds with the greatest carrier bandwidth. For instance, if the SCC RL 1 138 is in use and the SCC RL N 144 is in use, the RRC 110 can determine that the SCC RL 1 138 is using a component carrier that has a carrier bandwidth with a frequency of $f_4$ (e.g., 20 MHz), while the SCC RL N 144 is using a carrier bandwidth with a frequency of $f_3$ (e.g., 10 MHz). It is understood that the frequencies of 10 MHz and 20 MHz are for illustration purposes only. Because, in this example, the carrier bandwidth of the SCC RL N 144 (i.e., $f_3$) is less than the carrier bandwidth of the SCC RL 1 138, the RRC 110 may activate additional radio receivers (e.g., the RR 6 132) before one or more available radio receivers are allocated and activated for use to support the SCC RL N 144. In some embodiments, the RRC 110 may continue to activate radio receivers to support an SCC RL corresponding with the greatest carrier bandwidth until the active receiver capacity 116 is met for the SCC RL, such as a maximum of five radio receivers in use to support each of the SCC RLs 138-144. In some embodiments, frequency division duplexing may be used to support the SCC RLs 138-144, and thus, in some embodiments, an aggregated carrier bandwidth (i.e., the aggregation of all carrier bandwidths used to support the particular SCC RL) may be used to determine which SCC RL corresponds with the greatest bandwidth. In some embodiments, the additional radio receivers may remain active to support one or more of the PCC RL 136 and/or the SCC RLs 138-144 until one or more of the display 106 being turned off, the IP call 174 ending, the UE 102 moving away from the service edge 150, the data application 121 being no longer in the foreground (and thus not actively in use by the user 152), the BCS 178 reaching a critical level (e.g., less than 10% battery life), a combination thereof, or the like. In some embodiments, the RRC 110 may implement the operations discussed herein when higher order spatial multiplexing is unavailable (e.g., when the number of RRs 126-134 outnumber a total number of the AP RTs 164-172) and/or link adaptation mechanisms (e.g., 256 quadrature amplitude modulation) are unavailable and/or unsuitable for implementation (e.g., based on a channel quality indicator being below a threshold (e.g., a value of 15), a low signal to noise ratio, a precoding matrix indicator, a rank indicator, or the like.

In some embodiments, the RRC 110 can create an autonomous receiver activation message (ARAM) 182. In some embodiments, the ARAM 182 can indicate which of the one or more RRs 126-134 are active and being used on the UE 102 to support communications with the AP 146 over the communication path 1. For example, the AP 146 may have initially sent radio resource control signaling to the UE 102 to instruct the UE 102 to use the PCC RL 136 and one or more SCC RLs (e.g., the SCC RL 1 138 and/or the SCC RL N 144). However, in some embodiments, the AP 146 may not know which radio receivers were initially used, and which radio receivers were subsequently activated to support network communications along the PCC RL 136 and/or the SCC RLs 138-144. For example, the ARAM 182 can indicate that five radio receivers are in use to support the PCC RL 136, identify each of the five radio receivers (e.g., the RRs 128-130), and/or identify that the RRs 128-130 were added to provide additional communication and processing resources to support the PCC RL 136. Similarly, if one or more SCC RL is in use for the communication path 1 (e.g., the SCC RL 1 138 and the SCC RL N 144), the ARAM 182 can indicate which RRs correspond with each SCC RL (e.g., the RRs 131, 132 for the SCC RL 1 138 and the RR 134 for the SCC RL N 144) of the communication path 1. In some embodiments, the ARAM 182 also can indicate (e.g., by including the available receivers identifier 118 in the ARAM 182) how many radio receivers remain available on the UE 102 for use in communicating with the network 180 (e.g., via the AP 146 and/or another access point associated with the network 180). In some embodiments, the ARAM 182 can include an instruction that commands the AP 146 to setup one or more SCC RLs (either using the AP 146 and/or via another access point within range of the UE 102) to maximize the use of available radio receivers on the UE 102. The ARAM 182 can be provided to the AP 146 via the communication path 1 and/or via another transmission path, such as via another communication technology (e.g., 3G, WiFi, etc.). In some embodiments, the operations also can include providing the ARAM 182 to the AP 146 to inform the AP 146 of which of the plurality of RRs (e.g., any of the RRs 126-134) are active on the UE 102.

It is also understood that zero, one, or more than one instance of the UE 102, the processor 104, the display 106, the battery 108, the memory 109, the communication components 122, the transceivers 124, the RRs 126-134, the BCS 178, the activity state 112, the user interface state 113, the RRC 110, the active receiver capacity 116, the available receivers identifier 118, the demand threshold 120, the data applications 121, the communication path 1, the PCC RL 136, the SCC RLs 138-144, the primary cell 148, the secondary cell 154, the ARAM 182, the IP call 174, the second UE 176, the AP 146, the processor 156, the memory 158, the AP communication components 160, the AP transceivers 162, the AP RTs 164-172, and instances of elements included therein, can be included within the operating environment 100. It is understood that the examples are for illustration purposes only and should not be construed as limiting in any way.

Figure 2:
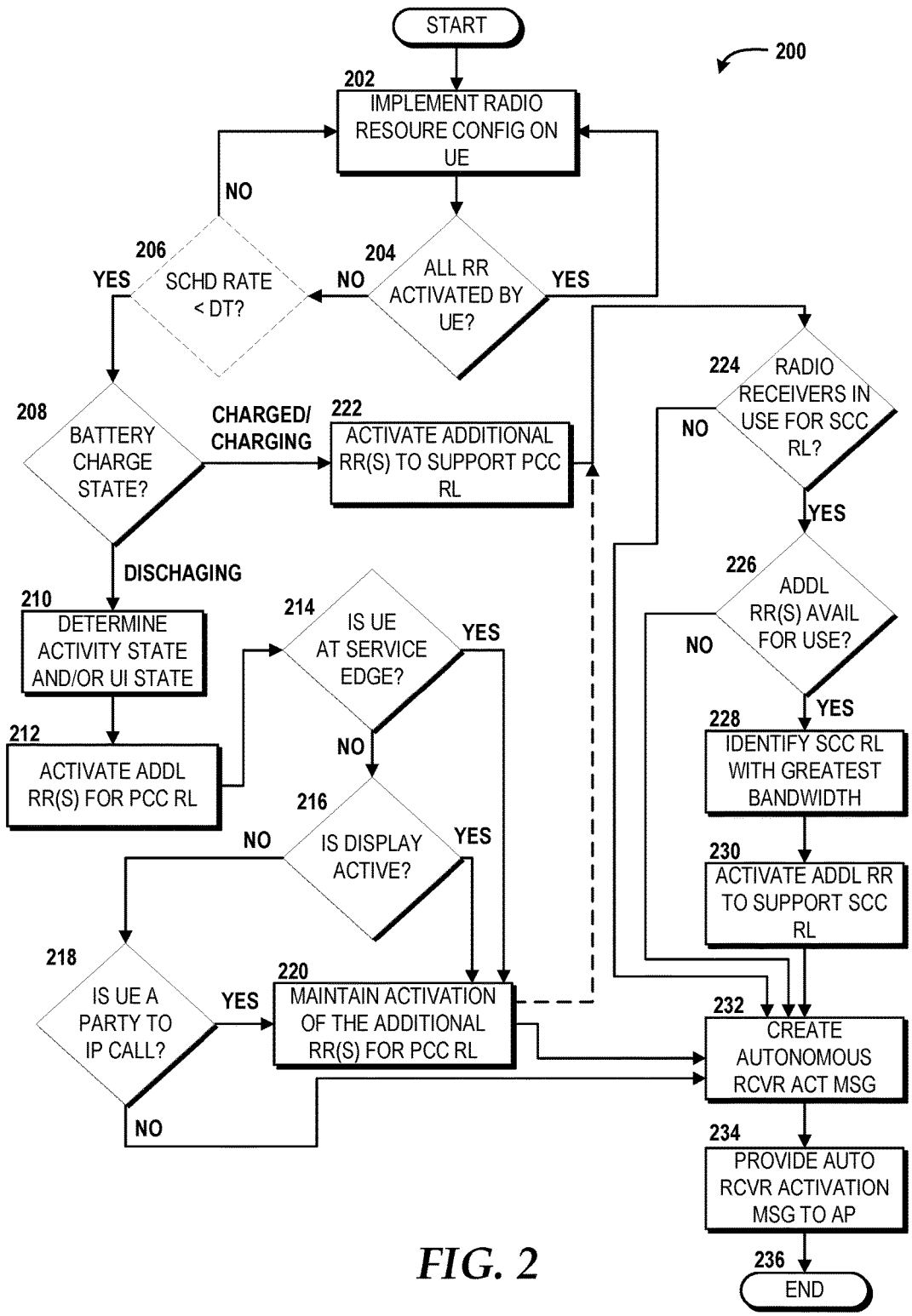
FIG. 2 is a flow diagram illustrating a method for providing power efficient radio receiver control for a user equipment, according to an embodiment of the present disclosure.

Turning now to FIG. 2, aspects of a method 200 for providing power efficient radio receiver control for user equipment will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage medium, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multi-processor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of a computing system or user equipment discussed herein, such as but not limited to the UE 102, the second UE 176, and/or the AP 146, to perform one or more operations and/or causing the processor to direct other components of a computing system or device to perform one or more of the operations.

For purposes of illustrating and describing some of the concepts of the present disclosure, operations of the method 200 are described as being performed, at least in part, by the UE 102 via execution, by one or more processors, of one or more software modules that configures one or more processors (e.g., the RRC 110). It should be understood that additional and/or alternative devices and/or network devices can provide the functionality described herein via execution of one or more modules, applications, and/or other software. Thus, the illustrated embodiments are illustrative, and should not be viewed as being limiting in any way.

The method 200 will be described with reference to FIG. 1. The method 200 begins and proceeds to operation 202, where the RRC 110 can implement a radio resource configuration such that the UE 102 may initially use radio resource control signaling and setup the PCC RL 136 for communicating network traffic along the communication path 1. The RRC 110 can activate one or more radio receivers (e.g., the RRs 126-134) to support the PCC RL 136 in uplink (i.e., sending) and downlink (i.e., receiving) communications. In some embodiments, the RRC 110 may use one or more radio receivers to setup and engage in downlink communications on one or more SCC RL, such as any of the SCC RLs 138-144.

From operation 202, the method 200 can proceed to operation 204, where the RRC 110 can determine whether all of the RRs 126-134 of the UE 102 have been activated and put into use by the UE 102 or if any of the RRs 126-134 remain available for activation and use to support communicative coupling with the AP 146 via the PCC RL 136 and/or one or more SCC RL. For example, the UE 102 may use radio resource control signaling to setup the PCC RL 136 using two radio receivers, such as the RR 0 126 and the RR 1 127. In an embodiment where all RRs on the UE 102 are active and put into use to support the PCC RL 136, or the PCC RL 136 and one or more SCC RLs 138-144, then the RRC 110 can determine that no RRs remain available for use, and proceed from the operation 202, along the YES path, and return to operation 202. However, if at least one of the RRs 126-134 is available and not activated by the UE 102, then from operation 204, the method 200 can follow the NO path. In an embodiment, the method 200 can optionally proceed to operation 206. In embodiments, the method 200 can proceed directly from operation 204 to operation 208. For clarity, the optional operation 206 will be discussed.

At operation 206, the RRC 110 can determine whether the scheduling rate 114 of network traffic is less than the demand threshold 120. When the scheduling rate 114 is not less than the demand threshold 120 (i.e., the scheduling rate 114 is equal to or above the demand threshold 120), then the method 200 can proceed along the NO path back to the operation 202. When the scheduling rate 114 is less than the demand threshold 120, then the method 200 can proceed along the YES path to operation 208. It is understood that the operation 206 is optional, and therefore may not occur in the method 200.

At operation 208, the RRC 110 can determine whether the BCS 178 indicates that that the battery 108 is charged, charging, or discharging. For clarity, the discussion of the method 200 will first provide a discussion of operations that can, in some embodiments, follow the operation 208 based on the RRC 110 determining that the BCS 178 indicates the battery is discharging. The discussion will then return to operation 208 and provide an explanation of an embodiment in which the BCS 178 indicates that the battery 108 is charged or charging. Thus, in an embodiment in which the BCS 178 indicates that the battery 108 is discharging, the method 200 can proceed to operation 210.

At operation 210, the RRC 110 can determine an activity state and/or a user interface state of the UE 102, such as the activity state 112 and/or the user interface state 113 of the UE 102. For example, in an embodiment, the activity state 112 can indicate that a data application, such as the data application 121, is actively executing on the UE 102. In other embodiments, the user interface state 113 can indicate that the display 106 is on and/or a speaker of the UE 102 is in use. In some embodiments, when the activity state indicates that the UE 102 is active (e.g., via use of a data application) and/or the user interface state indicates that the display and/or speaker is on and being used, the method 200 can proceed to operation 212. At operation 212, the RRC 110 can activate at least one or at least two additional RRs to support communication of network traffic over the PCC RL 136, where the communication can include sending and receiving transmissions with the AP 146. For example, if the PCC RL 136 is initially supported by the RR 0 126 and the RR 1 127, the RRC 110 can activate the RR 2 128 and the RR 3 129 to support the PCC RL 136 in communicating with the AP 146. In some embodiments, only one additional RR is activated (e.g., the RR 2 128) to support the PCC RL 136. In other embodiments, more than two additional RRs are activated and put into use such that the active receiver capacity 116 for the PCC RL 136 is met, such as activating three additional RRs 128-130 to support the PCC RL 136. In some embodiments, the operation 212 can reoccur until the active receiver capacity 116 is met for the PCC RL 136, such that a maximum number of radio receivers are activated to support communicating over the PCC RL 136 of the communication path 1.

From operation 212, the method 200 can proceed to operation 214, where the RRC 110 can determine whether the UE 102 is located at and/or near a service edge, such as the service edge 150 of the primary cell 148. For example, the RRC 110 can determine that a data packet loss rate is above a loss rate threshold, such as 50% of packets being lost, and/or signal strength is low, such as less than 30% of signal being received, thereby indicating that the UE 102 is at and/or near the service edge 150 of the primary cell 148. In some embodiments, when the RRC 110 determines that the UE 102 is located at or near the service edge 150 of the primary cell 148, the method 200 can proceed along the YES path to operation 220, where the RRC 110 can maintain activation of at least one additional (e.g., the RR 2 128 and the RR 3 129) to support the PCC RL 136 while the UE 102 continues to be located at or near the service edge 150 of the primary cell 148. Returning to operation 214, in some embodiments, the RRC 110 determines that the UE 102 is not located at or near the service edge 150 of the primary cell 148, and therefore the method 200 can proceed along the NO path to operation 216.

At operation 216, the RRC 110 can determine whether the display 106 is active (e.g., when the display 106 is on and/or a speaker of the display 106 is being used to play sounds or music) or whether the display 106 or speaker has been turned off. In some embodiments, if the RRC 110 determines that the display 106 is active, then the method 200 can proceed along the YES path to operation 220, where the RRC 110 can maintain of the at least one or at least two radio receivers that serve as additional radio receivers (e.g., at least the RR 2 128 and the RR 3 129) to support the PCC RL 136. In some embodiments, the additional radio receivers (e.g., at least the RR 2 128 and the RR 3 129) can remain active at least until the display 106 is off or otherwise not active. Returning to operation 216, in an embodiment in which the RRC 110 determines that the display 106 is not active, the method 200 can proceed along the NO path to operation 218.

At operation 218, the RRC 110 can determine whether the UE 102 is participating in an IP call, such as a Voice over LTE call, a WiFi call, or the like. Thus, although the display 106 and/or speaker of the UE 102 is off, the RRC 110 may still seek to determine whether the additional radio receivers should continue to be active and supporting the PCC RL 136. For example, the RRC 110 can determine that the data application 121 is being used for the IP call 174, which can be in progress and occurring via the PCC RL 136 of the communication path 1, even though the display 106 is turned off. In some embodiments, if the UE 102 is participating in an IP call (e.g., the IP call 174), then the method 200 can proceed along the YES path to operation 220.

At operation 220, the RRC 110 can maintain activation of the at least one or the at least two radio receivers that serve as the additional radio receivers to support the primary component carrier radio link being used for the IP call, such as the RR 2 128 and the RR 3 129 that support the PCC RL 136 that is being used for the IP call 174. In some embodiments, the RRC 110 will maintain the activation of the additional radio receivers being used to support the IP call 174 (e.g., the RR 2 128 and the RR 3 129) for a duration of the IP call 174 that is in progress via the PCC RL 136 (i.e., until the IP call 174 has ended). In some embodiments, the RRC 110 may (a) periodically repeat operations 214, 214, and 218 to determine whether additional radio receivers should be activated or continue to remain active. Returning to operation 218, in some embodiments where the UE 102 is not participating in the IP call 174, the method 200 can proceed along the NO path from operation 218 to operation 232. In other embodiments, the method 200 can proceed to operation 232 from operation 220. For clarity, discussion of the operation 232 will be provided below. In some embodiments, after the RRC 110 has activated one or more radio receivers to support the PCC RL 136, the RRC 110 may determine whether additional radio receivers should be used to support downlink communications (i.e., only receiving transmissions of network communications) via a SCC RL. To do so, in some embodiments, the method 200 can proceed from operation 220 to operation 224. For clarity, the discussion will return to operation 208 and follow the YES path to operation 222, followed by a discussion of operation 224.

Returning to operation 208, if the RRC 110 determines that the BCS 178 indicates that the battery 108 is charged and/or charging, the method 200 can proceed from operation 208 to operation 222. At operation 222, the RRC 110 can activate at least one additional radio receiver to support the PCC RL 136, such as one or more of the RRs 128-134. In some embodiments, the RRC 110 may continue to activate additional RRs until the active receiver capacity 116 is met for the PCC RL 136. For example, if initially the RR 0 126 and the RR 1 127 were being used to support the PCC RL 136, and the RRC 110 determines that the active receiver capacity 116 for the PCC RL 136 indicates a maximum of five radio receivers can be used, then the RRC 110 can activate an additional three RRs, such as the RRs 128-130.

From operation 222, the method can proceed to operation 224, where the RRC 110 can determine whether any RRs are being used to support one or more SCC RLs (e.g., the SCC RLs 138-144). If the RRC 110 determines that no radio receivers are in use for one or more of the SCC RLs 138-144 (and thus only the PCC RL 136 supports network traffic and communications via the communication path 1), the method 200 can proceed along the NO path to operation 232, which will be discussed below. Returning to operation 224, if the RRC 110 determines that at least one radio receiver is being used to support one or more SCC RLs (e.g., the SCC RLs 138-144), then the method 200 can proceed along the YES path to operation 226.

At operation 226, the RRC 110 can determine whether any radio receivers are available for use (e.g., whether one or more of the RRs 126-134 are not in use, but capable of being used to support the communication path 1). In an embodiment where all radio receivers are being used and no available radio receivers remain, the method 200 can proceed along the NO path to operation 232, which will be discussed in detail below. In an embodiment where at least one radio receiver is available for use and can be activated to support the communication path 1, then the method 200 can proceed along the YES path to operation 228.

At operation 228, the RRC 110 can identify how many SCC RLs are in use and which SCC RL has the greatest carrier bandwidth. In an embodiment in which only one SCC RL is in use (e.g., only the SCC RL 1 138 is in use in addition to the PCC RL 136), then the RRC 110 may use that SCC RL irrespective of the carrier bandwidth. In some embodiments where two or more SCC RLs are in use (e.g., the SCC RL 1 138, the SCC RL 2 140, the SCC RL 3 142, and the SCC RL N 144), then the RRC 110 may determine which SCC RL corresponds with a carrier bandwidth that is greatest. For example, the RRC 110 may determine that the SCC RL 1 138 uses the highest carrier bandwidth (e.g., 20 MHz). From operation 228, the method 200 can proceed to operation 230.

At operation 230, the RRC can activate one or more additional radio receivers to support one or more SCC RLs (e.g., one or more of the SCC RLs 138-144) in only receiving network transmissions. For example, if only one SCC RL is being used in addition to the PCC RL 136, then the RRC 110 can activate additional RRs (e.g., any of the RRs 126-134) that are available for use. In some embodiments, the RRC 110 can continue activating additional radio receivers until the maximum number of receivers are activated for the particular SCC RL, such as indicated by the active receiver capacity 116. For example, if initially the RR 5 131 is being used for the SCC RL 1 138, then the RRC 110 can (if available) activate an additional four radio receivers until the maximum of five, for example, radio receivers are in use for the SCC RL 1 138 (where in this example there are at least ten RRs on the UE 102, specifically five that are used to support the PCC RL 136 and five to support the SCC RL 1 138). In another embodiment in which two or more SCC RLs are in use to provide network traffic along the communication path 1, then the RRC 110 may activate additional radio receivers to the SCC RL that has the highest carrier bandwidth. In an embodiment, the RRC 110 may continue to activate additional radio receivers for the SCC RL with the highest carrier bandwidth until the maximum number of radio receivers can be activated, as indicated by the active receiver capacity 116. From operation 230, the method 200 can proceed to operation 232.

At operation 232, the RRC can create an autonomous receiver activation message, such as the ARAM 182. The ARAM 182 can indicate which of the one or more RRs 126-134 are active and being used on the UE 102 to support communications with the AP 146 over the communication path 1, such as via the PCC RL 136 and one or more of the SCC RLs 138-144. For example, the ARAM 182 can indicate that five radio receivers are in use to support the PCC RL 136. The ARAM 182 may also identify each of the five radio receivers (e.g., the RRs 128-130) being used to support the PCC RL 136. In some embodiments, the ARAM 182 may identify the RRs that were added to provide additional communication and processing resources to support one or more SCC RL (e.g., the SCC RL 1 138 and/or the SCC RL N 144). In some embodiments, the ARAM 182 can indicate which RRs correspond with each SCC RL (e.g., the RRs 131, 132 for the SCC RL 1 138 and the RR 134 for the SCC RL N 144) of the communication path 1. In some embodiments, the ARAM 182 also can indicate (e.g., by including the available receivers identifier 118 in the ARAM 182) how many radio receivers remain available on the UE 102 for use in communicating with the network (e.g., via the AP 146 and/or another access point associated with the network 180). From operation 232, the method can proceed to operation 234. At operation 234, the RRC 110 can provide the ARAM 182 to the AP 146 to inform the AP 146 of which of the plurality of RRs (e.g., any of the RRs 126-134) are active on the UE 102. From operation 234, the method 200 can proceed to operation 236, where the method 200 ends.

Figure 3:
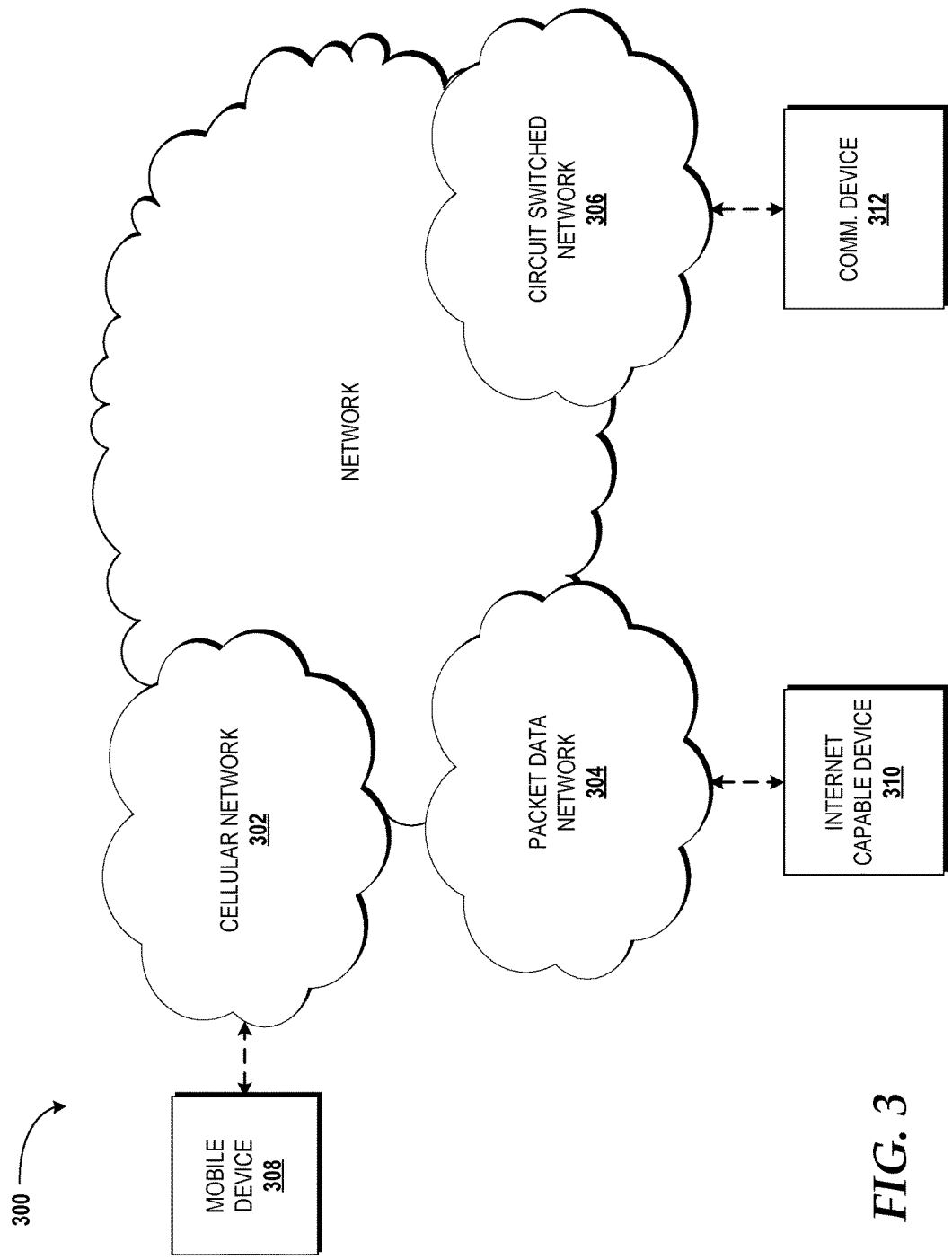
FIG. 3 is a block diagram illustrating an example network capable of implementing aspects of the embodiments presented herein.

Turning now to FIG. 3, details of a network 300 are illustrated, according to an illustrative embodiment. In some embodiments, the network 300 can include the network 180. The network 300 includes a cellular network 302, a packet data network 304, for example, the Internet, and a circuit switched network 306, for example, a PSTN. The cellular network 302 includes various network components such as, but not limited to, access points (e.g., but not limited to, base transceiver stations ("BTSs"), NBs, and/or eNBs, etc.), base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 302 also includes radios and nodes for receiving and transmitting voice, data, and combinations thereof to and from radio transceivers, networks, the packet data network 304, and the circuit switched network 306.

A mobile communications device 308, such as, for example, a cellular telephone, a user equipment, a mobile terminal, a PDA, a laptop computer, a handheld computer, and combinations thereof, can be operatively connected to the cellular network 302. In some embodiments, the UE 102 and/or the second UE 176 can be configured as the mobile communication device 308. The cellular network 302 can be configured as a 2G GSM network and can provide data communications via GPRS and/or EDGE. Additionally, or alternatively, the cellular network 302 can be configured as a 3G UMTS network and can provide data communications via the HSPA protocol family, for example, HSDPA, EUL (also referred to as HSUPA), and HSPA+. The cellular network 302 also is compatible with 4G mobile communications standards such as LTE, or the like, as well as evolved and future mobile standards, such as LTE-Advanced and carrier aggregation.

The packet data network 304 includes various devices, for example, servers, computers, databases, and other devices in communication with one another, as is generally known. The packet data network 304 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "hyperlinks" in the retrieved files, as is generally known. In some embodiments, the packet data network 304 includes or is in communication with the Internet. In some embodiments, the network 180 can be configured as a packet data network, such as the packet data network 304. The circuit switched network 306 includes various hardware and software for providing circuit switched communications. The circuit switched network 306 may include, or may be, what is often referred to as a plain old telephone system and/or a public switched telephone system. The functionality of a circuit switched network 306 or other circuit-switched network are generally known and will not be described herein in detail.

The illustrated cellular network 302 is shown in communication with the packet data network 304 and a circuit switched network 306, though it should be appreciated that this is not necessarily the case. One or more Internet-capable devices 310, for example, a personal computer, a laptop, a portable device, or another suitable user equipment device, can communicate with one or more cellular networks 302, and devices connected thereto, through the packet data network 304. It also should be appreciated that the Internet-capable device 310 can communicate with the packet data network 304 through the circuit switched network 306, the cellular network 302, and/or via other networks (not illustrated).

As illustrated, a communications device 312, for example, a telephone, facsimile machine, modem, computer, or the like, can be in communication with the circuit switched network 306, and therethrough to the packet data network 304 and/or the cellular network 302. It should be appreciated that the communications device 312 can be an Internet-capable device, and can be substantially similar to the Internet-capable device 310. In the specification, the network of FIG. 3 is used to refer broadly to any combination of the networks 302, 304, 306 shown in FIG. 3. It should be appreciated that, in some embodiments, substantially all of the functionality described with reference to the network 180 can be performed by the cellular network 302, the packet data network 304, and/or the circuit switched network 306, alone or in combination with other networks, network elements, and the like, according at least to aspects of the features and operations discussed herein.

Figure 4:
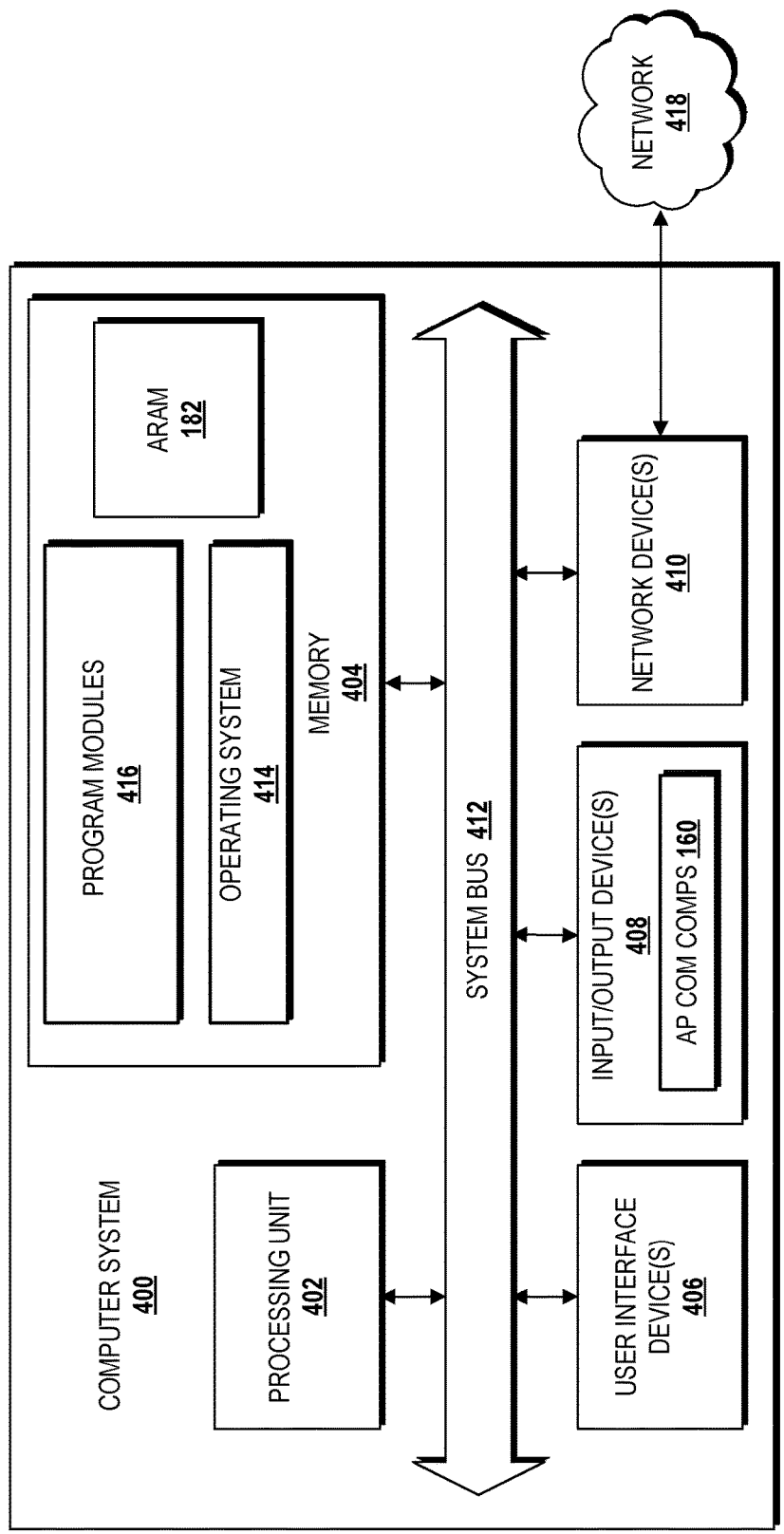
FIG. 4 is a block diagram illustrating an example computer system capable of implementing aspects of embodiments presented herein.

Turning now to FIG. 4 is a block diagram illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. In some embodiments, one or more of the AP 146, the second UE 176, and/or the user equipment 102, can be configured like the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, the ANDROID family of operating systems from ALPHABET INCORPORATED, the QNX family of operating systems from BLACKBERRY LIMITED, other operating systems, and the like.

The program modules 416 may include various software and/or program modules to perform the various operations described herein. In some embodiments, for example, the program modules 416 can include aspects of the operating environment 100, such as for example without limitation, the RRC 110 and/or other program modules. In some embodiments, these and/or other programs can be embodied in computer-readable media containing instructions that, when executed by the processing unit 402, configure the processing unit 402 to perform one or more of the method 200 described in detail above with respect to FIG. 2. According to some embodiments, the program modules 416 may be embodied in hardware, software, firmware, or any combination thereof. Although not shown in FIG. 4, it should be understood that the memory 404 also can be configured to store the activity state 112, the user interface state 113, the scheduling rate 114, the active receiver capacity 116, the available receiver identifier 118, the demand threshold 120, and/or other data, if desired.

By way of example, and not limitation, computer-readable media may include any available computer media or communication media that can be accessed by, for example without limitation, the computer system 400, the UE 102, and/or the user equipment 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable tangible storage medium implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by a particular, non-generic computer (e.g., but not limited to the computer system 400, the UE 102, the access point 146, the user equipment 500, etc.). In the claims, the phrase "computer storage medium" and variations thereof (e.g., but not limited to, "computer-readable storage medium") does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418 (e.g., the network 180). Examples of the network devices 410 include, but are not limited to, a modem, a radio frequency ("RF") or infrared ("IR") transceiver, a telephonic interface, a bridge, a router, a network card, the access point communication components 160 of the AP 146, and/or the communication components 122 of the UE 102. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be or may include a wired network such as, but not limited to, a Wide Area Network ("WAN"), a wired Personal Area Network ("PAN"), a wired Metropolitan Area Network ("MAN"), a VoIP network, an IP/MPLS network, a Public Switched Telephone Network ("PSTN") network, an Internet Multimedia subsystem ("IMS") network, an Evolved Packet Core ("EPC") network, or any other mobile network and/or wireline network.

Figure 5:
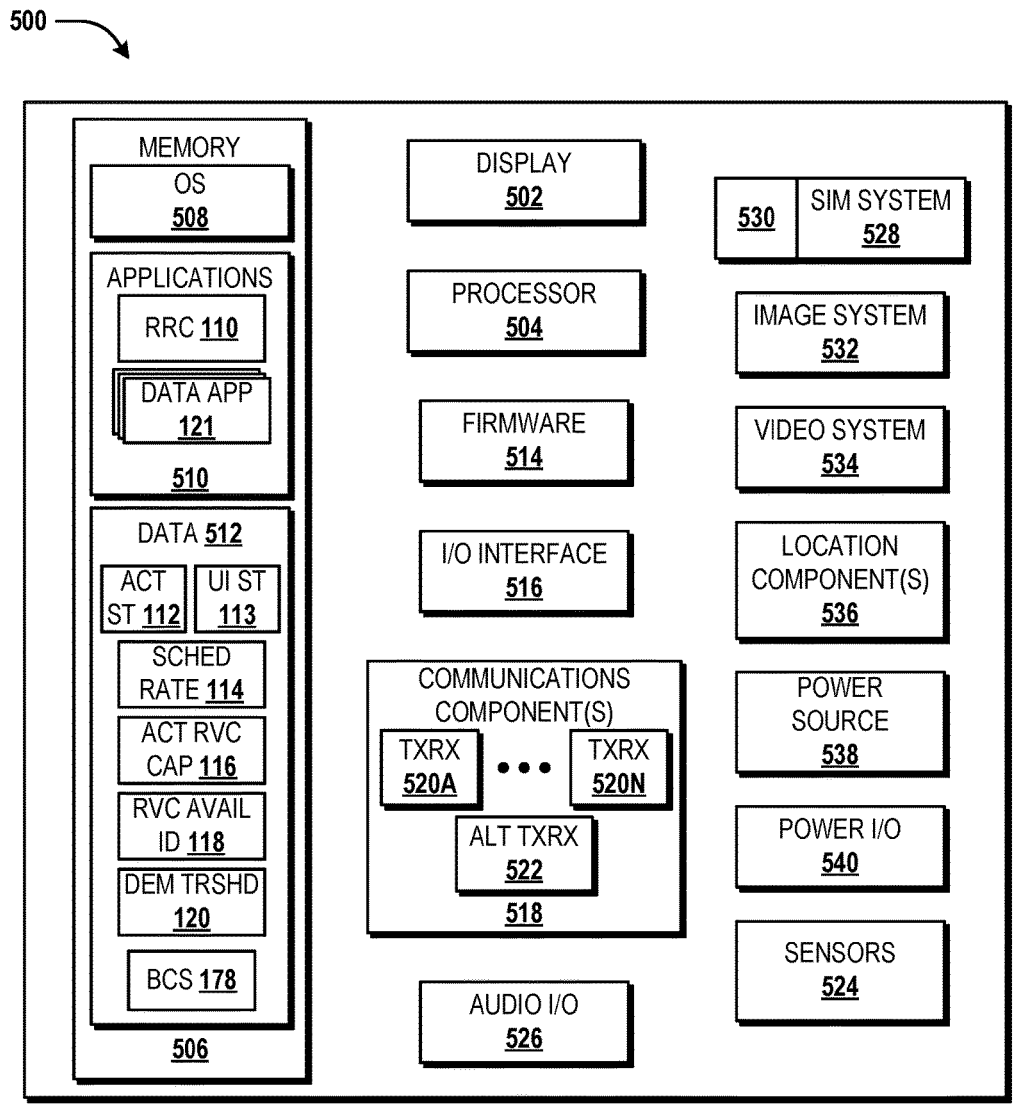
FIG. 5 is a block diagram illustrating an example user equipment capable of implementing aspects of the embodiments disclosed herein.

Turning now to FIG. 5, an illustrative user equipment 500 and components thereof will be described. In some embodiments, one or more of the UE 102 (shown in FIG. 1) can be configured like the user equipment 500. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). As shown in FIG. 5, the user equipment 500 is illustrated as a mobile communication device; however, this may not be the case for all embodiments and should not be used to limit the scope of the disclosure. Other embodiments of the user equipment 500 can include, but should not be limited to, a mobile communication device, an IP-enabled telephone device, a laptop, a desktop, a tablet computing device, a wearable computing device (e.g., a smart watch, smart glasses, smart shoes, etc.), a vehicle head unit, an exercise device, a smart appliance, a medical device, an internet-of-things device, set-top box device, a television, an alternate reality device, a virtual reality device, any other type of non-generic, combinations thereof, or any other particular computing device capable of initiating and/or receiving radio communications. Thus, it should be understood that FIG. 5 and the following description are intended to provide a general understanding of a suitable environment in which various aspects of embodiments can be implemented, and should not be construed as being limiting in any way.

As illustrated in FIG. 5, the user equipment 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The user equipment 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the user equipment 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing account information, answering/initiating calls via input of a called telephone number, entering/deleting data, entering and setting local credentials (e.g., user IDs and passwords) for device and/or web-resource access, configuring settings, manipulating address book content and/or settings, multimode interaction, interacting with other applications 510, and otherwise facilitating user interaction with the operating system 508, the applications 510, and/or other types or instances of data 512 that can be stored at the user equipment 500. The data 512 can include, for example, one or more identifiers, and/or other applications or program modules. As used herein, the term "module" refers to an instance of executable software, instructions, and/or commands that, upon execution, can configure a processor and/or other components of a device (e.g., the processor 104 and/or the communication components 122 of the UE 102) to provide operations and functions to support particular aspects at least of the power efficient radio receiver control discussed herein. In some embodiments, the data 512 can include one or more of the activity state 112, the user interface state 113, the scheduling rate 114, the active receiver capacity 116, the available receivers identifier 118, the demand threshold 120, the BCS 178, and/or any other data sent among and/or between the UE 102 and the access point 146. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. In some embodiments, the applications 510 can include the RRC 110 that can be resident on the UE 102 to facilitate power efficient radio receiver control. The applications 510 also can include one or more data application 121 that can rely on communication components (e.g., radio receivers and resources) during network communications with a network, such as the network 180. These and/or other programs can be embodied in computer-readable storage media containing instructions that, when executed by the processor 504, perform one or more of the method 200 described in detail above with respect to FIG. 2. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The user equipment 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the user equipment 500 can be configured to synchronize with another device to transfer content to and/or from the user equipment 500. In some embodiments, the user equipment 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the user equipment 500 and a network device or local device.

The user equipment 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks. In some embodiments, the communication components 122 and/or the access point communication components 160 (shown in FIG. 1) can be configured as the communication components 518.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE") (and variants thereof, such as LTE-Advanced, LTE-U, etc.), and various other 2G, 2.5G, 3G, 4G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), Spatial Multiplexing (e.g., Multiple Input Multiple Output "MIMO"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, Carrier Aggregation ("CA"), and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, an evolved packet core network, a WI-FI hotspot, an Internet service provider ("ISP"), a digital subscriber line ("DSL") provider, a broadband provider, combinations thereof, or the like.

The user equipment 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the user equipment 500 may be provided by an audio I/O component 526. The audio I/O component 526 of the user equipment 500 can include one or more speakers for the output of audio signals, one or more microphones for the collection and/or input of audio signals, and/or other audio input and/or output devices.

The illustrated user equipment 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the user equipment 500 are contemplated, it should be understood that these embodiments are illustrative, and should not be construed as being limiting in any way.

The user equipment 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The user equipment 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The user equipment 500 also can include one or more location components 536. The location components 536 can be configured to send and/or receive signals to determine a geographic location of the user equipment 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the user equipment 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the user equipment 500. Using the location component 536, the user equipment 500 can generate and/or receive data to identify its geographic location, or to transmit data used by other devices to determine the location of the user equipment 500. The location component 536 may include multiple components for determining the location and/or orientation of the user equipment 500.

The illustrated user equipment 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the user equipment 500 can include additional and/or alternative components, the above embodiment should be understood as being illustrative of one possible operating environment for various embodiments of the concepts and technologies described herein. The described embodiment of the user equipment 500 is illustrative, and should not be construed as being limiting in any way.

Based on the foregoing, it should be appreciated that concepts and technologies directed to power efficient radio receiver control have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" as used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The description discussed herein is provided to enable any person skilled in the art to practice the various aspects described herein. Various modifications to these aspects will be readily apparent to those skilled in the art, and the principles discussed and defined herein may be applied to other aspects. Thus, the claims are not intended to be limited to the aspects shown herein, but are to be accorded the full scope consistent with the claim language, where reference to "an" element in the singular is not intended to mean "one and only one" unless specifically so stated, but rather "one or more." Unless specifically stated otherwise, the terms "an" and "some" refer to one or more. Headings and subheadings, if any, are used for convenience only and do not limit the subject disclosure.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A user equipment comprising:
   a plurality of radio receivers that are configured to communicatively couple to an access point;
   a processor; and
   a memory that stores computer-executable instructions that, in response to execution by the processor, cause the processor to perform operations comprising:
      confirming that a battery charge state of the user equipment indicates charged or charging, wherein at least one of the plurality of radio receivers is initially active to support communicative coupling with the access point via a primary component carrier radio link,
      activating, based on the battery charge state of the user equipment, additional radio receivers that are available from the plurality of radio receivers to support the primary component carrier radio link until an active receiver capacity for supporting the primary component carrier radio link is met,
      determining that the user equipment is receiving, via at least one of the additional radio receivers of the plurality of radio receivers or the at least one of the plurality of radio receivers, transmissions from the access point via a plurality of secondary component carrier radio links,
      identifying a secondary component carrier radio link of the plurality of secondary component carrier radio links that corresponds with a greatest carrier bandwidth, and
      activating at least one other radio receiver of the plurality of radio receivers other than the at least one of the plurality of radio receivers and the additional radio receivers of the plurality of radio receivers to support the secondary component carrier radio link that corresponds with the greatest carrier bandwidth.

2. The user equipment of claim 1, wherein the operations further comprise verifying that less than all of the plurality of radio receivers capable of supporting the primary component carrier radio link have been activated by the user equipment.

3. The user equipment of claim 2, wherein the operations further comprise creating an autonomous receiver activation message that indicates which of the plurality of radio receivers are active on the user equipment.

4. The user equipment of claim 3, wherein the operations further comprise providing the autonomous receiver activation message to the access point to inform the access point of which of the plurality of radio receivers are active on the user equipment.

5. The user equipment of claim 1, wherein the operations further comprise confirming that the at least one other radio receiver of the plurality of radio receivers other than the at least one of the plurality of radio receivers and the additional radio receivers of the plurality of radio receivers remains available to support receiving transmissions from the access point via the plurality of secondary component carrier radio links.

6. The user equipment of claim 5, wherein the active receiver capacity for supporting the primary component carrier radio link is met prior to activation of the at least one other radio receiver to support receiving transmissions from the access point via the secondary component carrier radio link that corresponds with the greatest carrier bandwidth.

7. A computer storage medium having computer-executable instructions stored thereon that, in response to execution by a processor of a user equipment, cause the processor to perform operations comprising:
   confirming that a battery charge state of the user equipment indicates charged or charging, wherein at least one of a plurality of radio receivers of the user equipment is initially active to support communicative coupling with an access point via a primary component carrier radio link;
   activating, based on the battery charge state of the user equipment, additional radio receivers that are available from the plurality of radio receivers to support the primary component carrier radio link until an active receiver capacity for supporting the primary component carrier radio link is met;
   determining that the user equipment is receiving, via at least one of the additional radio receivers of the plurality of radio receivers or the at least one of the plurality of radio receivers, transmissions from the access point via a plurality of secondary component carrier radio links;
   identifying a secondary component carrier radio link of the plurality of secondary component carrier radio links that corresponds with a greatest carrier bandwidth; and activating at least one other radio receiver of the plurality of radio receivers other than the at least one of the plurality of radio receivers and the additional radio receivers of the plurality of radio receivers to support the secondary component carrier radio link that corresponds with the greatest carrier bandwidth.

8. The computer storage medium of claim 7, wherein the operations further comprise verifying that less than all of the plurality of radio receivers capable of supporting the primary component carrier radio link have been activated by the user equipment.

9. The computer storage medium of claim 8, wherein the operations further comprise creating an autonomous receiver activation message that indicates which of the plurality of radio receivers are active on the user equipment.

10. The computer storage medium of claim 9, wherein the operations further comprise providing the autonomous receiver activation message to the access point to inform the access point of which of the plurality of radio receivers that are active on the user equipment.

11. The computer storage medium of claim 7, wherein the operations further comprise confirming the at least one other radio receiver of the plurality of radio receivers other than the at least one of the plurality of radio receivers and the additional radio receivers of the plurality of radio receivers remains available to support receiving transmissions from the access point via the plurality of secondary component carrier radio links.

12. The computer storage medium of claim 11, wherein the active receiver capacity for supporting the primary component carrier radio link is met prior to activation of the at least one other radio receiver to support receiving transmissions from the access point via the secondary component carrier radio link that corresponds with the greatest carrier bandwidth.

13. A user equipment comprising:
a plurality of radio receivers that are configured to communicatively couple to an access point;
a processor; and
a memory that stores computer-executable instructions that, in response to execution by the processor, cause the processor to perform operations comprising:
confirming that a battery charge state of the user equipment indicates discharging, wherein at least one of the plurality of radio receivers of the user equipment is initially active to support communicative coupling with the access point via a primary component carrier radio link,
determining that a user interface state of the user equipment indicates that a data application is active on a display of the user equipment, and
based at least on determining that the user interface state of the user equipment indicates that a data application is active on the display of the user equipment,
activating additional radio receivers from the plurality of radio receivers to support the primary component carrier radio link,
determining that the user equipment is receiving, via at least one of the additional radio receivers of the plurality of radio receivers or the at least one of the plurality of radio receivers, transmissions from the access point via a plurality of secondary component carrier radio links,
identifying a secondary component carrier radio link of the plurality of secondary component carrier radio links that corresponds with a greatest carrier bandwidth, and
activating at least one other radio receiver of the plurality of radio receivers other than the at least one of the plurality of radio receivers and the additional radio receivers of the plurality of radio receivers to support the secondary component carrier radio link that corresponds with the greatest carrier bandwidth.

14. The user equipment of claim 13, wherein the operations further comprise:
determining that the user equipment is located at a service edge of a primary cell associated with the primary component carrier radio link, wherein the access point provides the primary cell; and
maintaining activation of the additional radio receivers and the at least one other radio receiver while the user equipment continues to be located at the service edge of the primary cell.

15. The user equipment of claim 13, wherein activation of the additional radio receivers and the at least one other radio receiver is maintained at least until the user interface state of the user equipment indicates that the data application is no longer active.

16. The user equipment of claim 15, wherein the operations further comprise:
determining that the data application that is active is associated with an internet protocol call that is in progress via the primary component carrier radio link; and
maintaining activation of the additional radio receivers and the at least one other radio receiver for a duration of the internet protocol call that is in progress via the primary component carrier radio link.

* * * * *